June 24, 1941.　　J. S. ABERCROMBIE ET AL　　2,246,565
PLASTIC PACKING STUFFING BOX
Filed Nov. 16, 1939　　2 Sheets-Sheet 1
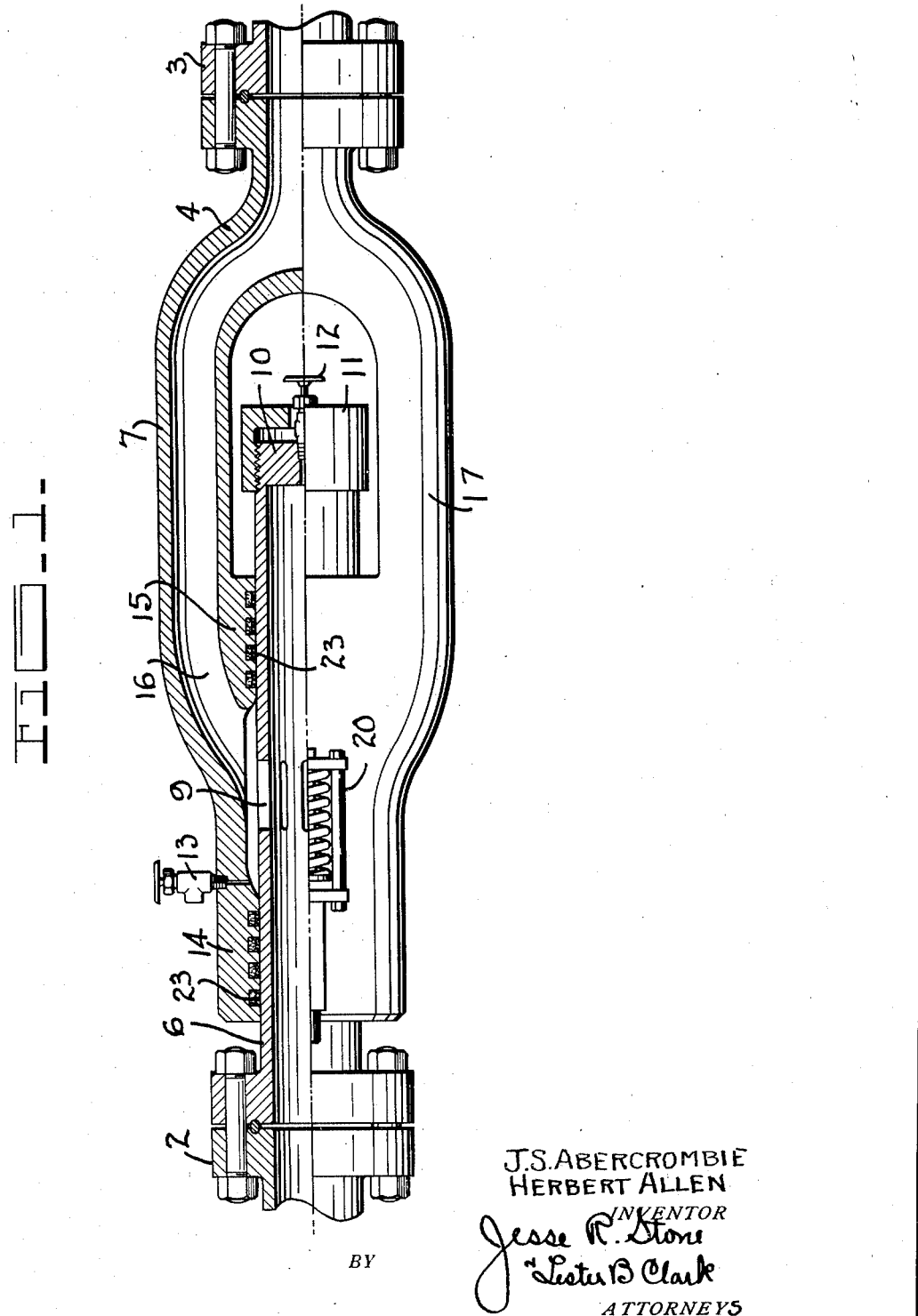
J.S. ABERCROMBIE
HERBERT ALLEN
INVENTOR
BY Jesse R. Stone
Lester B Clark
ATTORNEYS June 24, 1941. J. S. ABERCROMBIE ET AL 2,246,565
PLASTIC PACKING STUFFING BOX
Filed Nov. 16, 1939 2 Sheets-Sheet 2
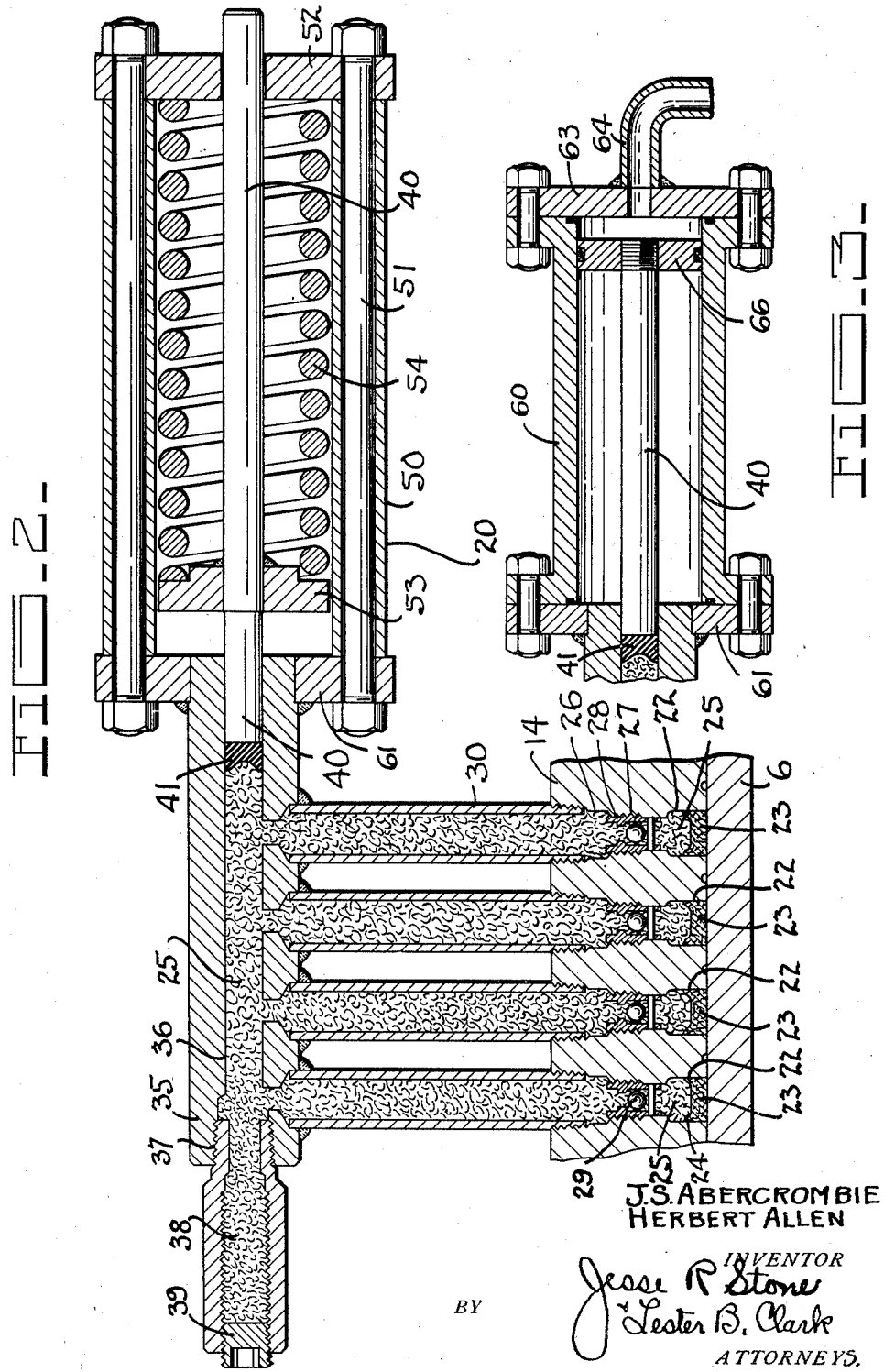
INVENTOR
J. S. ABERCROMBIE
HERBERT ALLEN
BY Jesse R Stone
Lester B. Clark
ATTORNEYS.

Patented June 24, 1941

2,246,565

UNITED STATES PATENT OFFICE 2,246,565

PLASTIC PACKING STUFFING BOX

James S. Abercrombie and Herbert Allen, Houston, Tex., assignors to Cameron Iron Works, a corporation of Texas Application November 16, 1939, Serial No. 304,640

3 Claims. (Cl. 285—162)

The invention relates to a plastic packing stuffing box wherein a uniform and predetermined pressure may be applied by the use of plastic packing to a plurality of sealing rings.

The invention may be applied under various conditions but it has been here illustrated as applied to an expansion joint in pipe lines where a seal against a predetermined pressure must be maintained.

It is one of the objects of the invention to provide a uniform pressure at a plurality of sealing rings.

Another object of the invention is to provide a packing assembly wherein a plastic packing material is maintained in a reservoir under pressure so that a uniform pressure may be maintained upon a plurality of sealing areas.

Another object of the invention is to provide a plunger and spring construction for maintaining a pressure on a reservoir of plastic packing.

Another object of the invention is to provide a sealing assembly for expansion joints in pipe lines.

Still another object of the invention is to provide a sealing for concentric pipe members.

A still further object of the invention is to provide a unit area pressure against a packing which is greater than the pressure which is being packed against.

Other and further objects of the invention will be readily apparent when the following description is considered in connection with the accompanying drawings, wherein:

Fig. 1 is a side elevation of an expansion joint for pipelines to which the invention has been applied.

Fig. 2 is a sectional view thru the packing assembly illustrating the manner of maintaining a uniform pressure upon a plurality of sealing members.

Fig. 3 shows a fluid pressure operated head to maintain a pressure on the packing where the packed pressure may be utilized.

In Fig. 1 an expansion joint is illustrated wherein the pipe members 2 and 3 are provided with a connection 4 which will permit relative sliding movement for purposes of expansion and contraction.

The connection 4 is made up of a pipe 6 and a yoke 7. The pipe 6 has a plurality of openings 9 therein so that fluid may pass into or out of the pipe. The end of the pipe is closed by a block 10 and cap 11 with a valve 12 in the block 10 so as to allow the discharge of fluid from the pipe if desired or for purposes of cleaning out the pipe. A bleed off valve 13 is carried by the yoke 7.

The periphery of the pipe 6 is arranged to be contacted by one end of the yoke 7 and this yoke has the spaced collars 14 and 15, one of these collars being positioned on each side of the openings 9 so that the flow of fluid thru the branch passages 16 and 17 may serve as the connection between the pipe 3 and pipe 6.

It seems obvious therefore that any pressure in the passages 16 will tend to leak around the periphery of the pipe 6 thru the collars 14 and 15. In order to provide such leakage the sealing assembly 20 has been applied to each of the collars 14 and 15.

The particular construction of the sealing assembly is best seen in Fig. 2 wherein a portion of the collar 14 has been illustrated as being formed with a plurality of grooves 22. Each groove carries a ring 23 of packing material which may be asbestos or any other suitable type of packing material which is arranged to abut the periphery of the pipe 6.

These sealing rings 23 are arranged to fit snugly within the grooves 22 and may have the lips 24 thereon to prevent leakage of the plastic packing or substance 25 which is forced into the base of grooves 22 behind the sealing rings 23.

The base of each groove has an opening 26 leading therefrom and a nipple 27 in each opening carries a check valve 28 which will prevent leakage from the base of the groove when it engages upon the seat 29 in the nipple. The check valve, however, will permit the passage of fluid toward the groove.

Each opening 26 has a sleeve 30 connected thereto which has its opposite end fixed to a housing 35. This housing has a chamber 36 therein which acts as a reservoir for some of the plastic packing 25.

The plastic packing may be inserted into the reservoir 36 thru the opening 37 which carries a plug 38. This plug may be removed and a plastic packing inserted or the stop member 39 may be removed from the end of the plug and the packing inserted. The plug 39 may be screwed inwardly to apply additional pressure to the plastic packing 25 within the reservoir.

In order to provide for automatic application of pressure to the plastic packing 25 and to maintain the packing under a uniform pressure in all of the grooves 22 a plunger or rod 40 is arranged for sliding movement in the chamber 36. A seal off plug 41 may be placed at the end of the plunger to prevent leakage of the packing past the rod.

In order to apply a resilient pressure to the rod or plunger 40 and to normally urge it against the packing a cage 50 is shown as attached to one end of the housing. This cage is made up of a plurality of rods 51 which hold the end piece 52 in position. A disc 53 is fixed to the plunger 40 and a compression spring 54 is confined between the end piece 52 and the disc 53. In this manner by utilizing any desired strength of spring or by utilizing different lengths of bolts 51, it seems obvious that a predetermined pressure tending to force the plunger 40 against the packing may be employed.

The particular advantage of this arrangement is that the same pressure is applied to all of the grooves 22 and all of the rings 23 so that no one ring is compelled to pack off in more than a predetermined pressure. In this manner a unit area pressure may be set up in the plastic packing material 25 which is equal to or slightly in excess of the pressure within the pipes 2 and 3 so that it exceeds the pressure which is being packed against and in this manner leakage will be insured.

The description of Fig. 2 will be applied to the collar 14 but it will be understood that a similar packing arrangement will be provided in the collar 15 and suitable pressure applied to it.

Fig. 3 shows a modification of the manner of applying the pressure to the rod or plunger 40 wherein a cylinder 60 has been shown as having been attached to the flange 61 of Fig. 2. This cylinder is closed by a cap plate 63 which is the pipe or conduit 64 which is removable in the cylinder 60 by fluid pressure applied thru the pipe 64.

It is intended that this pipe 64 may be connected to the pressure which is being sealed against by the packing. In view of the fact that the piston 66 has a larger exposed area than the end of the plunger 40 permits a greater unit pressure to be applied to the plastic packing in the reservoir 25 than is available between the members where the packing is forming a seal. This pressure can be varied in accordance with circumstances depending upon the size or diameter of the piston 66 which is used.

With a construction of this sort any variations in pressure in the members where the seal is being maintained is automatically compensated for by a similar and consequent variation in pressure in the conduit 64 so that the pressures will be proportional at all times with a view of avoiding any adjustment of the pressure applied to the plunger 40 as might be necessary in connection with the use of the spring 54 of Fig. 2.

Broadly the invention contemplates a fluid pressure stuffing box wherein a uniform pressure can be maintained at a plurality of points.

What is claimed is:

1. In a pressure packing device including a housing to receive a body of plastic packing, a plurality of discharge ports therein, a plunger movable in said housing to maintain a pressure on the plastic packing, means to apply pressure to the plunger including a cage on said housing, and a spring in said cage having one end affixed to said plunger, and additional means at the other end of said housing to introduce plastic packing in opposition to the pressure of said plunger.

2. An expansion joint for pipes including a pipe end, a yoke straddling said end, outlets from said pipe to said yoke, means to seal the periphery of the pipe in the yoke at each side of said outlets, said means including a plurality of packing rings, and means to maintain a fluid pressure behind said rings which is uniform on all the rings and greater than the pressure in the pipe.

3. An expansion joint for pipes including a pipe end, a yoke straddling said end, outlets from said pipe to said yoke, means to seal the periphery of the pipe in the yoke at each side of said outlets, said means including a plurality of packing rings, and means to maintain a fluid pressure behind said rings which is uniform on all the rings and greater than the pressure in the pipe including a reservoir for plastic packing, a plunger to maintain pressure on such packing, a passage from said reservoir to each packing ring, and means to normally urge said plunger against the plastic packing.

JAMES S. ABERCROMBIE.
HERBERT ALLEN.